(12) United States Patent
Ogle

(10) Patent No.: US 9,776,063 B2
(45) Date of Patent: *Oct. 3, 2017

(54) SPORTS TRAINING APPARATUS

(71) Applicant: Peter Ogle, San Marcos, CA (US)

(72) Inventor: Peter Ogle, San Marcos, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/942,752

(22) Filed: Nov. 16, 2015

(65) Prior Publication Data
US 2016/0067585 A1  Mar. 10, 2016

Related U.S. Application Data

(63) Continuation-in-part of application No. 14/595,953, filed on Jan. 13, 2015, now abandoned.

(60) Provisional application No. 61/926,505, filed on Jan. 13, 2014.

(51) Int. Cl.
| A63B 71/06 | (2006.01) |
|---|---|
| A63B 71/02 | (2006.01) |
| G09B 19/00 | (2006.01) |
| A63B 5/00 | (2006.01) |
| A63B 69/00 | (2006.01) |
| A63B 60/00 | (2015.01) |

(52) U.S. Cl.
CPC ............ *A63B 71/0619* (2013.01); *A63B 5/00* (2013.01); *A63B 71/02* (2013.01); *G09B 19/0038* (2013.01); *A63B 69/0071* (2013.01); *A63B 69/0095* (2013.01); *A63B 2060/0085* (2015.10); *A63B 2071/025* (2013.01); *A63B 2210/50* (2013.01); *A63B 2210/52* (2013.01); *A63B 2225/093* (2013.01)

(58) Field of Classification Search
CPC ........................... A63B 71/0619; A63B 71/02
See application file for complete search history.

(56) References Cited

U.S. PATENT DOCUMENTS

| 4,208,050 | A | * | 6/1980 | Perrine | A63B 5/16 |
|---|---|---|---|---|---|
| | | | | | 473/447 |
| 4,671,478 | A | * | 6/1987 | Schoenig | F16B 7/0413 |
| | | | | | 16/19 |
| 5,209,713 | A | * | 5/1993 | Brown | A63B 69/0071 |
| | | | | | 473/447 |
| 5,833,556 | A | * | 11/1998 | Ferrari | A63B 69/0071 |
| | | | | | 473/448 |
| 9,017,222 | B2 | * | 4/2015 | Hofeldt | A63B 5/00 |
| | | | | | 482/15 |
| 2003/0047203 | A1 | * | 3/2003 | Lah | E04H 15/48 |
| | | | | | 135/114 |

* cited by examiner

*Primary Examiner* — Gene Kim
*Assistant Examiner* — Jeffrey Vanderveen
(74) *Attorney, Agent, or Firm* — Eric Hanscom

(57) ABSTRACT

A sports training apparatus for training athletes to deliver a ball or other object at an appropriate arc. The sports training apparatus includes an adjustable horizontal target that is positioned between the athlete and the target. It gives guidance to the athlete at the time of release. The athlete's height, game being played, desired arc, technique employed and position on the court determine the appropriate configuration, placement, and use of the sports training apparatus described herein. Athletes use the sports training apparatus repeatedly to train, learn, and be able to repeat the desired arc for a particular shot in their sport.

9 Claims, 7 Drawing Sheets

SPORTS TRAINING APPARATUS

CROSS REFERENCE TO RELATED APPLICATIONS

This application is a continuation-in-part of U.S. patent application Ser. No. 14/595,953 filed on Jan. 13, 2015, which in turn claims the benefit of U.S. Prov. Pat. App. No. 61/926,505 filed on Jan. 13, 2014, the entireties of which are hereby incorporated by reference.

BACKGROUND OF THE INVENTION

Field of the Invention

This invention relates to the general field of sports equipment, and more specifically toward a sports training apparatus for training athletes to deliver a ball or other object at an appropriate arc. The sports training apparatus includes an adjustable horizontal target that is positioned between the athlete and the target. It gives guidance to the athlete at the time of release. The athlete's height, game being played, desired arc, technique employed and position on the court determine the appropriate configuration, placement, and use of the sports training apparatus described herein. Athletes use the sports training apparatus repeatedly to train, learn, and be able to repeat the desired arc for a particular shot in their sport.

This sports training apparatus, also referred to as a multi-sport arc trainer, is designed to give feedback to athletes that are training with a ball. It gives a visual cue for the arc needed to be successful at acquiring the target. It is important for the athlete to have a guide at the beginning of a skill to receive immediate knowledge of the preferred ball trajectory. When the ball reaches the target and has cleared the trainer, the athlete has achieved the desired arc. There are two main factors that determine success in sports that have a ball with a target. One is the appropriate direction of the given target. The second is the angle that the ball is released from the player. This device is not intended to help with the direction of the ball. Rather, it is used to give the player a feel for the angle at release that is optimum for the skill involved.

Other training apparatus have used round and square targets that require an athlete to "shoot through" the device to gain accuracy. This is flawed in two ways. First, there is an optimal arc desired in the skill, not a range. Shooting through a target gives the impression that anywhere within the target will get desired results. An optimum training aid will give as exact as possible a desired arc angle for the skill. Secondly, the limiting factor of a ring or square target makes it very difficult to use the aid in any kind of game like movement. It is very difficult to put a volleyball pass exactly in front of a ring target to insure that it will line up the setter with the target. Basketball players need to dribble and catch passes before shooting. It is hard to insure all of this happens exactly in front of a ring type target. Computer and radar devices do a good job of charting the arc with numbers and graphs, but they simply give you a result after the fact, and do not provide visual queues as the athlete is training. Thus there has existed a need for an apparatus for training athletes to deliver a ball at an appropriate arc while providing for game-like movements.

SUMMARY OF THE INVENTION

The current invention provides just such a solution by having a sports training apparatus for training athletes to deliver a ball or other object at an appropriate arc. The sports training apparatus includes an adjustable horizontal target that is positioned between the athlete and the target. It gives guidance to the athlete at the time of release. The athlete's height, game being played, desired arc, technique employed and position on the court are used to determine the appropriate configuration, placement, and use of the sports training apparatus described herein. Athletes use the sports training apparatus repeatedly to train, learn, and be able to repeat the desired arc for a particular shot in their sport.

In a particular embodiment, the sports training apparatus disclosed herein is designed with an eight foot range of side to side movement, which enables the player to move in a game like manner. The sports training apparatus disclosed herein not only provides feedback on whether a ball is on the correct arc, it aids the athlete in starting the ball on the desired arc.

The sports training apparatus includes an adjustable horizontal target. This apparatus should be positioned between the player and the target. The apparatus should be close to the player (for example, within six feet), so the release angle is quickly evaluated, and not placed at the height of the arc that is desired. The sports training apparatus gives guidance to the player at the time of release. There is no specific configuration as to the height and placement of the sports training apparatus that is necessarily applicable to all athletes because the variables for each player are without boundaries. The athlete's height, game being played, desired arc, technique employed and position on the court are always going to be variables that result in different desired configurations. The desired arc is determined, and then the apparatus is positioned with the desired height to allow repeatability of action with the ball. A training goal for the sports training apparatus herein is "correction at inception."

It is an object of the invention to provide an apparatus for training an athlete to strike, throw, hit, or otherwise displace a ball at a desired arc.

It is another object of the invention to provide an apparatus that is configurable for multiple athletes, sports, and situations.

It is a further object of this invention to provide an apparatus that aids athletes in starting a ball on a desired arc.

A particular embodiment for the sports training apparatus is designed to be easily moved around the playing area. A wheeled base has locking wheels to keep it stationary when in use. The first section of the telescoping upright is five feet. The second section extends to an additional four feet. The top section extends three feet. The top height for the extending section is thus twelve feet. The middle of the three extension poles is marked every three inches to allow the user to set the pole height at the same position. The top extension has a line where it is to be positioned each time to ensure height consistency. This will help ensure the same arc is being taught in subsequent practice sessions. There is an extension that extends parallel to the floor at the top of the telescoping pole and is eight feet long. It has a break in the middle with a sleeve that can be pulled apart for storage. It is connected to the telescoping pole with elastic cord that allows it to be folded in half. The parallel pole is the part used to guide the athlete's shot at release to the desired arc. There is a bell at the end of this parallel pole to give the player an auditory cue if the pole is contacted. The setup and take down time for this device has been timed at approximately ten seconds each.

Other embodiments of the current disclosure provide for an apparatus comprising a base portion, where the base portion comprises a plurality of caster wheels; a telescoping member, where the telescoping member is secured to the base portion; where the telescoping member comprises a plurality of coaxially engaging poles, and in one embodiment, three coaxially engaging poles, where the telescoping member further comprises a plurality of pole fasteners; a horizontal member; and an angle mount, where the angled mount secures the horizontal member to the telescoping member, where the horizontal member is substantially perpendicular to the telescoping member. It further comprises an angled member, where the angled member is secured to the telescoping member, where the angled member extends away from the telescoping member at an angle of between 40 degrees and 50 degrees inclusive, and in one embodiment, at an angle of 45 degrees. The angled member has a length of between 60 inches and 70 inches inclusive. The horizontal member comprises a plurality of horizontal sections and an elastic cord, where the elastic cord secures the horizontal sections together. The horizontal member further comprises a bell, where the bell is secured to an end of one of the horizontal sections. The horizontal member comprises a plurality of flags. The angle mount has an angle of greater than 90 degrees, wherein the horizontal member is nonetheless substantially perpendicular to the telescoping member. The telescoping member has a maximum length of at least 12 feet. The horizontal member has a length of at least 8 feet. The plurality of horizontal sections are tapered.

Further embodiments of the current disclosure provide for a base portion, where the base portion comprises four caster wheels; a telescoping member, where the telescoping member is secured to the base portion; where the telescoping member comprises three coaxially engaging poles, where the telescoping member further comprises two pole fasteners, where each pole fastener can restrict movement of one coaxially engaging pole relative to another; a horizontal member, where the horizontal member comprises two horizontal sections and an elastic cord, where the elastic cord secures the horizontal sections together; an angle mount, where the angled mount secures the horizontal member to the telescoping member, where the horizontal member is substantially perpendicular to the telescoping member; and an angled member, where the angled member is secured to the telescoping member, where the angled member extends away from the telescoping member at an angle of between 40 degrees and 50 degrees inclusive and towards the base portion. The angled member has a length of between 60 inches and 70 inches inclusive. The angled member extends away from the telescoping member at an angle of 45 degrees. The horizontal member further comprises a bell, where the bell is secured to an end of one of the horizontal sections. The plurality of horizontal sections is tapered.

Additional embodiments of the current disclosure include a method of using a sports training apparatus, where the sports training apparatus comprises a base portion, where the base portion comprises a plurality of caster wheels; a telescoping member, where the telescoping member is secured to the base portion; where the telescoping member comprises a plurality of coaxially engaging poles, where the telescoping member further comprises a plurality of pole fasteners; a horizontal member; and an angle mount, where the angled mount secures the horizontal member to the telescoping member, where the horizontal member is substantially perpendicular to the telescoping member; comprising the steps of: extended the telescoping member; engaging one or more of the plurality of pole fasteners; and hitting or throwing a ball over the horizontal member. The sports training apparatus further comprises an angled member, where the angled member is secured to the telescoping member, where the angled member extends away from the telescoping member at an angle of between 40 degrees and 50 degrees inclusive. The method further comprises the step of positioning an end of the angled member such that it is at a release point of the ball.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, an athlete, also referred to as a player, is an individual that participates in a sport that could potentially use a sports training apparatus; a court means a court, field, or other area of training or game play; a ball includes other similar objects, such as a shuttlecock; a pole or rod is an elongated member with one or more sections; a pole or rod may or may not be solid and may or may not have a round cross section, except that coaxially engaging poles must necessarily not be solid.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

DETAILED DESCRIPTION OF THE INVENTION

Figure 1:
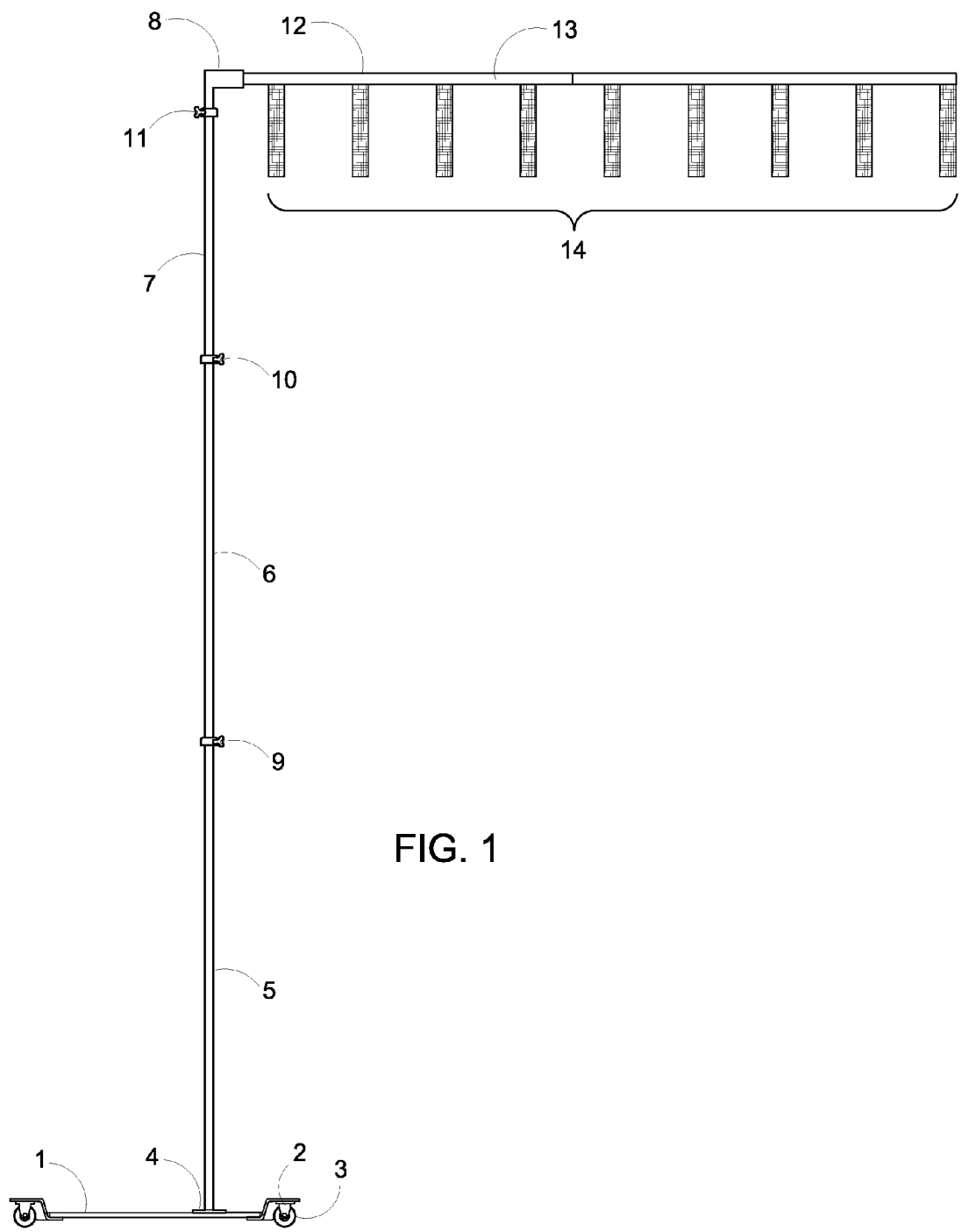
FIG. 1 is an expanded side view of a sports training apparatus according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is an expanded side view of a sports training apparatus according to selected embodiments of the current disclosure. Base plate (1) is a 3/16$^{th}$ thick steel plate and has steel wheel mounts (2) welded thereto. One swivel lockable caster (3) is secured to each wheel mount (2). Pole base (4) is secured to the base plate (1) by four bolts. A first telescoping pole (5) is welded to pole base (4). The first telescoping pole (5) has a length of three feet six inches, and has a diameter of one and one-quarter inches. A pole fastener (9), such as a pipe clamp with grip wing nut or spring-loaded releasable pin, is secured to the opposite end of the first telescoping pole (5) from where the first telescoping pole (5) is welded to the pole base (4). A second telescoping pole (6) is coaxially positioned within the first telescoping pole (5) and is allowed to coaxially slide in and out of the first telescoping pole (5), subject to being restrained by pole fastener (9). The second telescoping pole (6) has a length of four feet, and a diameter of one and one-eight inches. A pole fastener (10) is secured to the opposite end of the second telescoping pole (6) from where the second telescoping pole (6) engages first telescoping pole (5). A third telescoping pole (7) is coaxially positioned within the second telescoping pole (6) and is allowed to coaxially slide in and out of the second telescoping pole (6), subject to being restrained by pole fastener (10). The third telescoping pole (7) has a length of four feet six inches, and a diameter of one inch.

A horizontal rod is secured to the top of the third telescoping pole. A pole fastener (11) is secured to the opposite end of the third telescoping pole (7) from where the third telescoping pole (7) engages the second telescoping pole (6). A tubing angle mount (8) secures a horizontal rod (12) to the pole fastener (11) and the rest of the sports training apparatus. The horizontal rod (12) is nine feet long and has a plurality of flags (14) hanging therefrom. The horizontal rod (12) comprises two halves, each four foot six inch longs that mate together. An elastic cord (13) runs the length of the horizontal rod (12) keeping the two halves together when not mated together.

Figure 2:
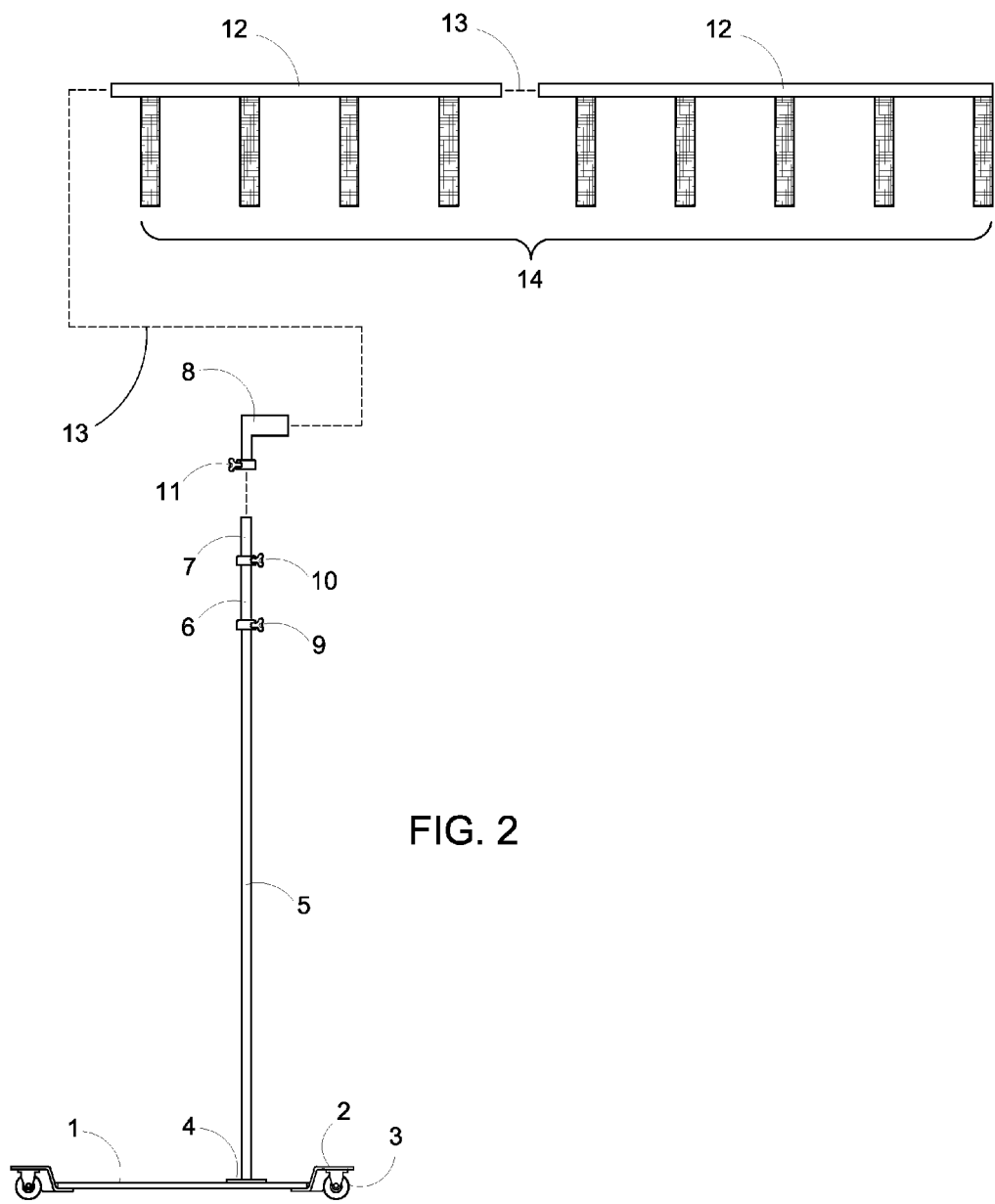
FIG. 2 is a collapsed side view of a sports training apparatus according to selected embodiments of the current disclosure.

FIG. 2 is a collapsed side view of a sports training apparatus according to selected embodiments of the current disclosure. Third telescoping pole (7) is shown collapsed within second telescoping pole (6), which in turn is shown collapsed within first telescoping pole (5). The horizontal rod (12) is expanded into two pieces, restrained together by the elastic cord (13).

Figure 3:
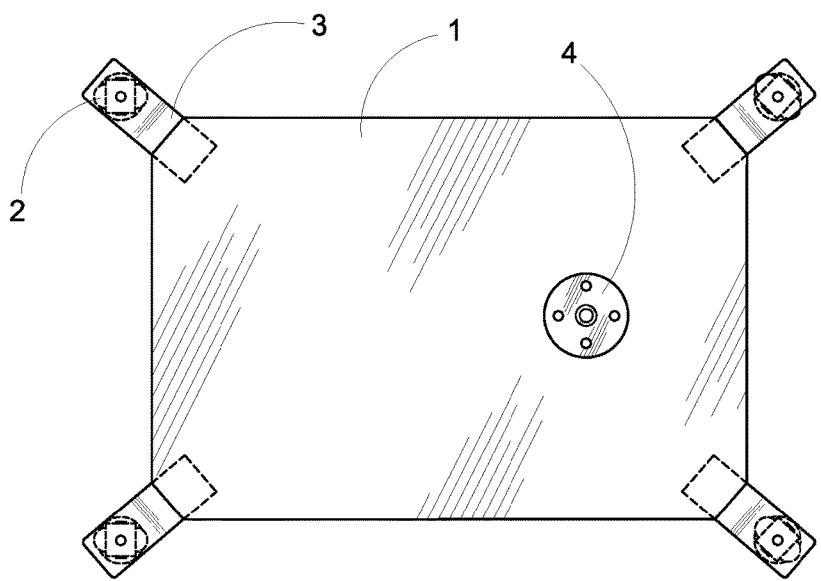
FIG. 3 is a top plan view of a sports training apparatus according to selected embodiments of the current disclosure.

FIG. 3 is a top plan view of a sports training apparatus according to selected embodiments of the current disclosure. The pole base (4) is secured off-center of the base plate (1).

Figure 4:
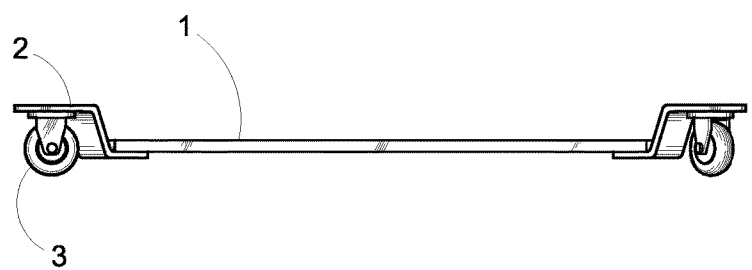
FIG. 4 is a side view of the base portion of a sports training apparatus according to selected embodiments of the current disclosure.

FIG. 4 is a side view of the base portion of a sports training apparatus according to selected embodiments of the current disclosure. The attachment of each lockable caster (3) is displaced from the plane of the base plate (1) via the wheel mounts (2) whereby the base plate (1) is closer to the ground than would otherwise be possible if the lockable casters (3) were secured to the base plate (1) on the same plane.

Figure 5:
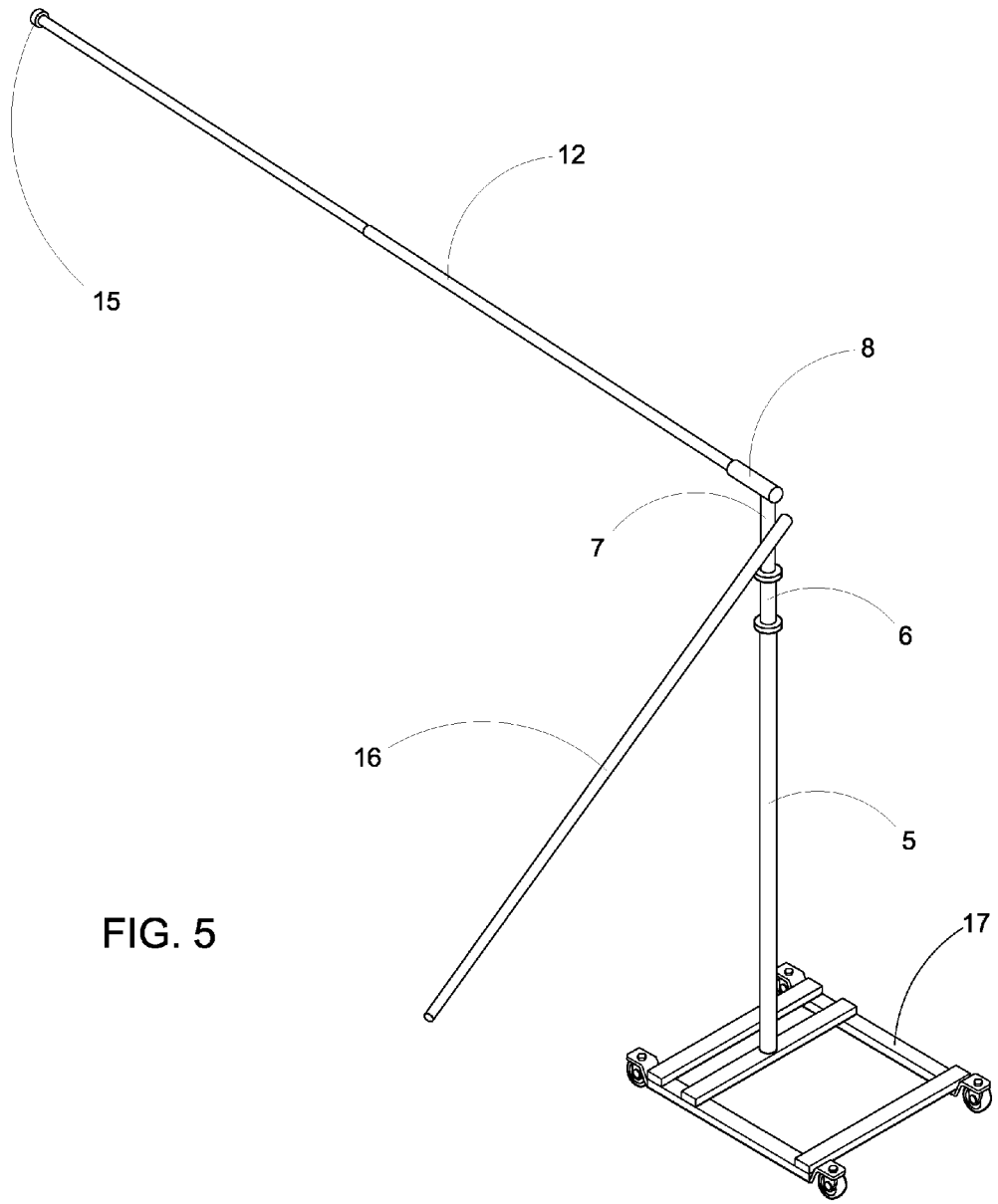
FIG. 5 is a perspective view of a sports training apparatus according to selected embodiments of the current disclosure.

FIG. 5 is a perspective view of a sports training apparatus according to selected embodiments of the current disclosure. The sports training apparatus includes a base portion (17) that supports a first telescoping pole (5). A second telescoping pole (6) mates within and is secured to the first telescoping pole (5). A third telescoping pole (7) mates with and is secured to the second telescoping pole (6). The first telescoping pole (5), the second telescoping pole (6), and the third telescoping pole (7) are collectively a telescoping member. The top of the third telescoping pole (7) has a tubing angle mount (8) secured thereto, which mates with a horizontal member that includes a horizontal rod (12). A bell (15) or other noise making device may be secured to the opposing end of the horizontal rod (12) to provide an audible signal if the horizontal rod (12) is struck. An angled pole (16) is also secured to the third telescoping pole (7).

The base portion includes multiple members secured to each other by fasteners, such as screws, welds, or bolts. Caster wheels enable the entire sports training apparatus to easily move from one position to another.

Figure 6:
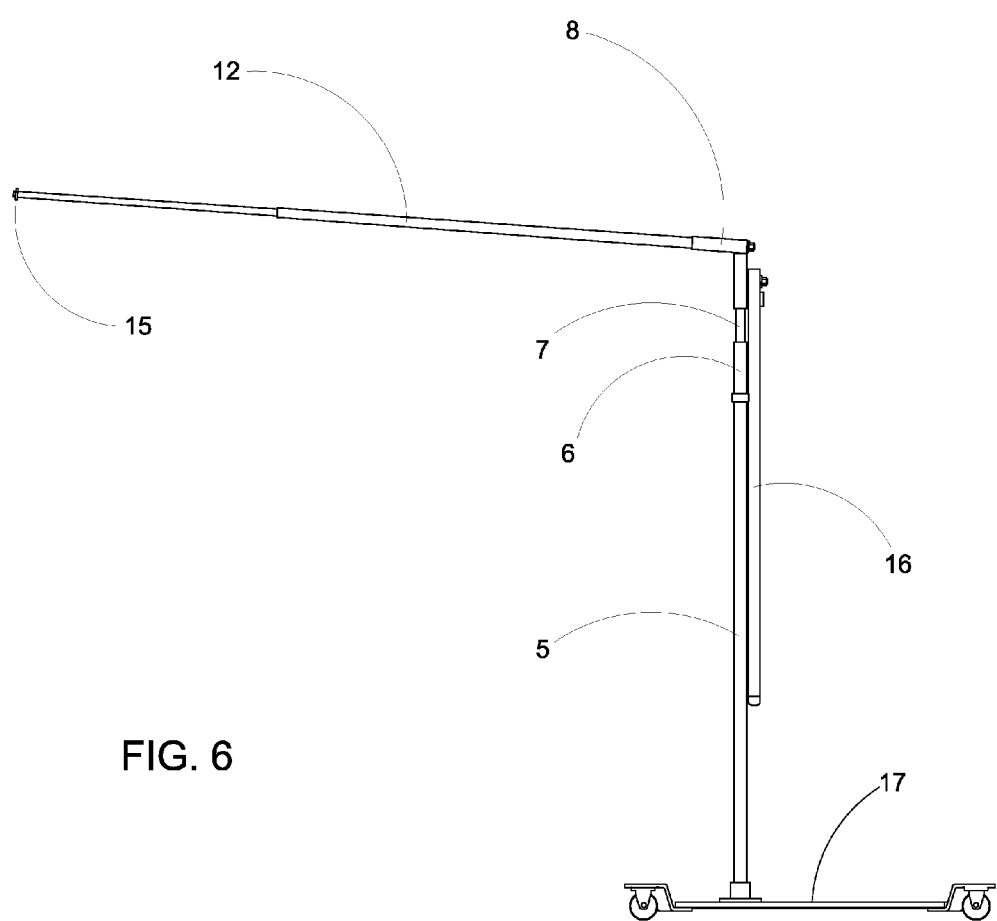
FIG. 6 is a front view of a sports training apparatus according to selected embodiments of the current disclosure.

FIG. 6 is a front view of a sports training apparatus according to selected embodiments of the current disclosure. The sports training apparatus includes a base portion (17) that supports a first telescoping pole (5). A second telescoping pole (6) mates within and is secured to the first telescoping pole (5). A third telescoping pole (7) mates with and is secured to the second telescoping pole (6). The top of the third telescoping pole (7) has a tubing angle mount (8) secured thereto. A horizontal member included a horizontal rod (12) is secured to the top of the third telescoping pole via a tubing angle mount (8). The horizontal rod (12) should be relatively parallel with the ground, or at about a ninety-degree angle from the third telescoping pole (7); however, slight variations in the angle of the horizontal rod are allowed and even expected. The horizontal rod can also taper along its length, where the cross section of the end furthest from the telescoping member is less than the cross section of the end closes to the telescoping member. Where the horizontal rod (or member) has multiple sections, each section can be tapered, whereby each horizontal section continues the taper from one end of the horizontal rod to the other. For example, if the cross section of the horizontal rod is circular, the horizontal rod is slightly conical. The angled rod (16) is shown extending at a downward angle.

The length and weight of the horizontal rod (12) can cause it to bend slightly. Furthermore, the fitting of the horizontal rod (12) within the angle mount (8) may not be exact, thereby resulting in some angular difference between the sleeve of the angle mount (8) and the horizontal rod (12). To account for these slight differences in angles, the angle mount (8) may be manufactured to hold the horizontal rod (12) at an angle other than ninety degrees. In a particular embodiment, the angle mount (8) positions the horizontal rod (12) at one-hundred degrees from the vertical (or telescoping member), or an angle of ten degrees above a line parallel with the ground (floor). At such an angle, tolerances in the fitting between the horizontal rod (12) and the angle mount (8) combined with the bend in the horizontal bar due to its own weight results in a horizontal rod that is at or near ninety degrees from the third telescoping pole (12) and at or near parallel with the ground. One will appreciate that as tolerances of the fittings and bend of the horizontal bar (12) are reduced, the angle of the angled mount (8) may approach ninety degrees.

A particular embodiment provides that the horizontal rod or member is eight feet in length to give the player a realistic area to make game like moves during practice. A shorter length would limit the player's ability to fake, dribble, receive a pass while using the sports training apparatus to work on game situations. The length allows movement from side to side while maintaining effectiveness of the arc trainer. Other than with the free throw, the player is moving during play. The sports training apparatus allows for continued guidance of the shot throughout these game related moves during practice. Furthermore, the horizontal member must break in the middle to allow compact storage when the sports training apparatus is not in use. The elastic cord through the middle allows the two horizontal segments to easily detach and reassemble. When the horizontal member is not in use, the cord may be used to keep the two pieces secure to the extending poles.

Figure 7:
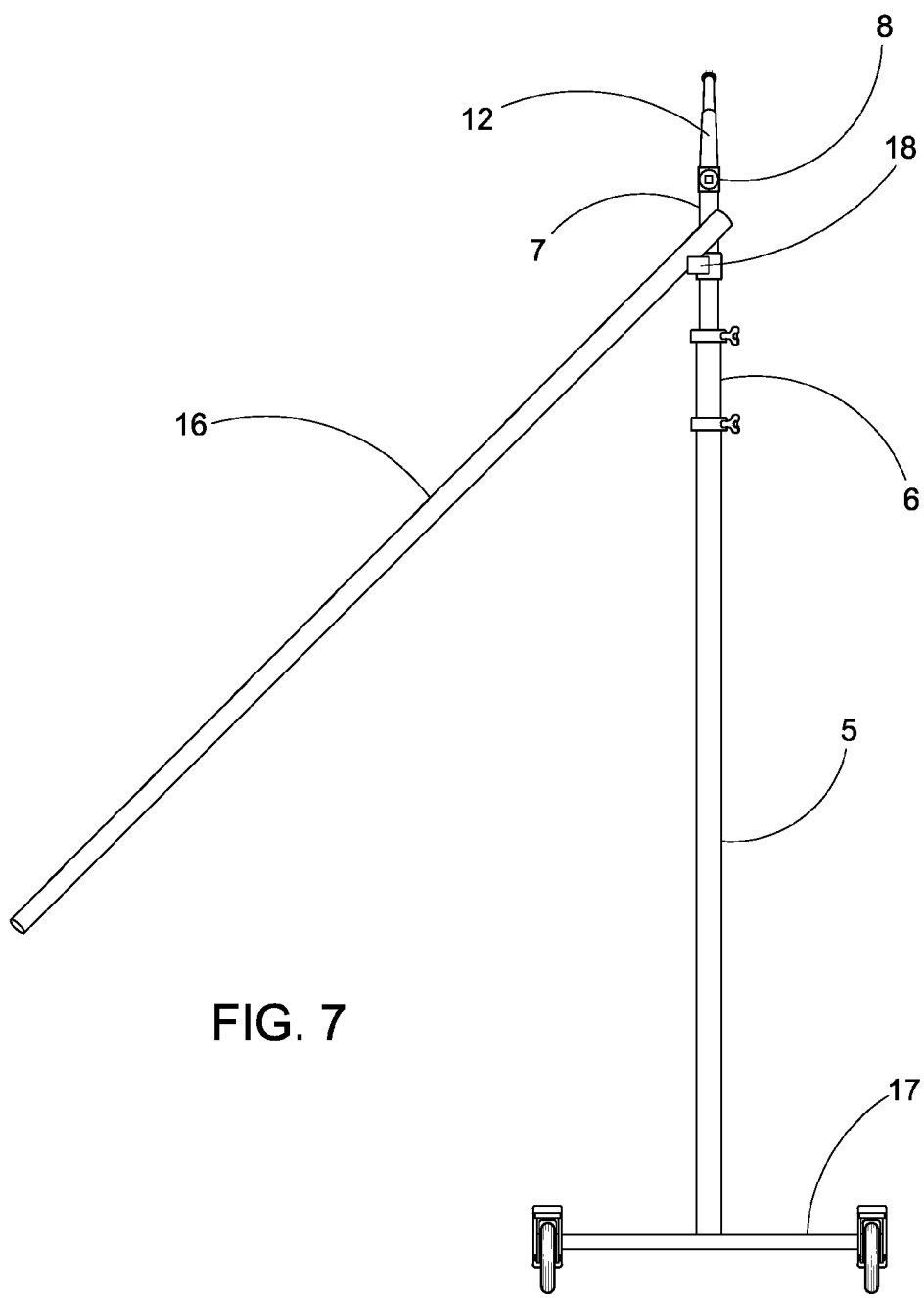
FIG. 7 is a side view of a sports training apparatus according to selected embodiments of the current disclosure.

FIG. 7 is a side view of a sports training apparatus according to selected embodiments of the current disclosure. The sports training apparatus includes a base portion (17) that supports a first telescoping pole (5). A second telescoping pole (6) mates within and is secured to the first telescoping pole (5). A third telescoping pole (7) mates with and is secured to the second telescoping pole (6). The top of the third telescoping pole (7) has a tubing angle mount (8) secured thereto, which mates with a horizontal rod (12). An angled pole attachment member 18 connects the angled pole (16) to the third telescoping pole (7).

The angled pole (16), or angled member, is affixed near the top of the third telescoping pole. In one embodiment, the angled pole (16) extends away from the telescoping member at a fixed angle of forty-five degrees. In other embodiments, the angled pole (16) extends away from the telescoping poles at a fixed angle between forty degrees and fifty degrees. In a particular embodiment, the length of the angled pole is between sixty-five inches and seventy inches. In another embodiment, the length of the angled pole is 68.5 inches. The angled pole (16) provides a release-point guide for athletes looking to make a shot with a ball at a specific arc, such as in the sport of basketball.

In a particular embodiment, the base portion for the sports training apparatus is 36 inches by 32 inches. It is made of metal in an H formation. The single center section is 24 inches and the two cross sections of the H formation are 36 inches. The center section may in fact be offset from the center of the other two cross sections. Furthermore, additional cross sections may be included for additional support and stability. The base section can also be a solid shape. The base material is 4 inch by 1 inch steel bars or a wood platform. The wood is ¾" plywood backed with 2 inch by 6 inch boards cut to length. The base rides on four, 3 inch caster wheels that have a break feature. The wheels are free rotating and are bolted to the four extensions of the base or to each corner of the wood platform. The extension pole is mounted 6 inches from the end on the shorter cross section.

The first piece of the extension pole is welded or otherwise affixed to a plate that will be bolted to the base. This first extension is 4 feet, 6 inches long and when mounted on the base brings the top to 4 feet, 9 inches in height. The second section that is inserted into the first is 5 feet long. When it is fully extended from the first section it will reach 8 feet, 9 inches from the floor. This allows for a 1 foot overlap in the first section. The third section is 4 feet, 6 inches long and inserted into the second section. When fully extended with the other two sections, the top height of the extension pole is 12 feet. This allows for a 1 foot, 3 inch overlap of the third section into the second section. Alternatively, the first telescoping pole can be 5 feet in length, the second telescoping pole can be 4 feet, 6 inches in length, and the third telescoping pole can be 3 feet, six inches in length, where each pole when fully extend overlaps its adjacent pole by at least six inches.

The extension poles are made of lightweight aluminum, fiberglass, or PVC pipe. They fit snugly but freely inside the section below. The poles are lifted out starting with the top section and clamped in place with a lever clamp that is around the base top below. The sections can also be stationed at the desired height with a pin system. The pin is inserted into predrilled holes at 3 inch intervals. When the clamp is applied, it constricts the top of the pole below and prevents the upper section from slipping downward. These clamps are mounted on the first two sections. The 6 inch long and 1 inch inside diameter sleeve is formed with a securing bottom portion. This portion is bolted to the top extension. The sleeve portion is at a 90 to 100 degree angle to the floor. The fiberglass horizontal stick or rod that protrudes from the sleeve is the guide for the ball. The ball must go over this stick during each ball action as a guide for the desired arc. The fiberglass stick is similar to a fishing pole with its strength and flexibility. The stick is in two parts. The part that is inserted into the sleeve is 4 feet, 6 inches. The second part is 4 feet. The 4 feet, 6 inches section is big enough for the 4 foot section to be inserted. There is a pin in the larger section that allows the smaller section to penetrate 6 inches. The horizontal stick is 8 feet long when in used. There is a bungee cord threaded through a stop washer, the sleeve, the first section of the stick, the second section of the stick and another stop washer. The bungee cord is stretched to a tension that holds the stick firmly together and inside the sleeve. The bungee cord is then knotted at both ends. There is a 6 inch piece of the bungee cord extending from the stick, fitted with a hook. For storage, the 4 foot section is pulled free from the longer 4 foot, 6 inch section. The 4'6" section is pulled from the sleeve. The two pieces are folded together and strapped to the extension pole using the bungee cord and hook.

For volleyball, the sports training apparatus disclosed herein will be used to train the setter, passer, and hitter in volleyball. For setting, it is important for the ball to be delivered on target with the correct tempo. The goal of the apparatus is to give the setter a physical, discernible guide for the set. The release angle of the set will determine if the ball arrives at the target with the desired speed. The trainer is set near the setter to give the setter a very obvious gauge to proper release angle. The higher the crossbar is placed, the slower the ball will arrive at the target after clearing the crossbar. The sports training apparatus moves easily around the court to enable the setter to practice all sets with a constant guide as to the desirable arc of the set. Backsets are reinforced by the bell ringing on contact with the ball. This allows the setter to get a feel for the correct arc for the desired set immediately. For example, in a volleyball session for the setter, roll the sports training apparatus to the desired position (within six feet of the setter). Then, insert the horizontal target into the sleeve and place the outer half into position. Raise the extension pole to 9 feet for your 6 foot jump setter. Pass 20 balls and have her set to target. This will reinforce a quick tempo set to the outside. Raise the target to 12 feet and pass another 20 balls. This will reinforce a high set to the outside allowing for consistent feedback for the arch desired. Again this is just an example. The positioning of the horizontal target will depend on the desired tempo and the setter.

Passing is also used to develop a tempo to the offense of a volleyball team. The arc angle of the pass is the determining factor for the tempo of the offensive play. The sports training apparatus is used to give the athlete the desired arc of the pass from each area of the court. It is placed close to the passer to give immediate feedback as to the correctness of the arc.

The sports training apparatus may also be used with the hitters to practice their tip shots. The trainer will be set up near the net to simulate the height of the opposing blockers. This will give the hitter a constant gauge for the desired height in hitting the desired tip shot. It will also be used to help the setter to develop the desired height for the "dump" shot. The ability to move the trainer around the court and adjust the height allows the setter to develop all the shots needed from anywhere on the court.

For basketball, the sports training apparatus will be used to develop the proper arc on any given shot. The optimum arc for a shot in basketball allows the shooter to have the best possible chance of the ball going through the hoop. A hoop is twice the size of a men's basketball. The straighter the ball enters the hoop, the more area is available. The lower the arc, the more precise the shot has to be for it to go in. The goal is to have the most advantageous arc for each shot. The trainer is placed at the desired height and distance from the player that will cause the ball to begin its flight on the correct arc. The player has an instant guide at release to insure the optimal arc is being achieved. The trainer can be positioned to accommodate any shot by positioning the base and horizontal rod to achieve the desired arc. Finger rolls to running lob shots, to three pointers can be given the perfect arc guidance from anywhere on the court. Beginners to advanced players can improve their performance when they get more consistent with the desired arc of each shot. The sports training apparatus can be positioned to free the desired portion of the court used to simulate game action, allowing the player to move in a live game manner. For example, position the sports training apparatus at the side of the lane. Adjust the height for the six foot shooter at eleven feet. Place the trainer within six feet of the shooter and shoot twenty free throws. Roll the trainer to the three point line and again position the horizontal target to generate the desired arc at release. Have the player break to the shooting spot to receive a pass, working on catching and squaring up to the basket before shooting. Again, take 20 attempts. The needed arc for success is continually being taught with each shot.

The angled pole may also be used to assist with basketball. The end of the angled pole is positioned such that it is at the end of the release point of the shooter. When the basketball player releases the basketball, it should travel over the horizontal rod. The sports training apparatus provides both a visual guide of where the ball should travel for an appropriate arc in basketball. An alternative embodiment provides for a horizontal rod that extends to both dies of the telescoping member, such that when the angled pole is used, variations in the angle (left or right) of the shot will still travel over the horizontal rod in many instances.

For tennis, the sports training apparatus can be used to develop the desired arc for the tennis lob or drop shot. The lob shot requires the ball stay in the boundaries of the court, be high enough to clear the opposing player, and arrive quickly enough to not allow the opponent the chance to recover for a return. The drop shot requires a specific arc to clear the net and fall short of the opponent. From anywhere on the court, there is an optimum arc for the lob or drop to achieve these goals. With the trainer in front of the player, it is possible to get consistent repetitions of the shot to develop the desired result. With a coach or machine delivering a consistent ball, the player is able to run to a spot and repeatedly put their racket in a position that will create the preferred arc. Because the trainer is close to the player, the needed arc angle is immediately apparent and learned.

For slow pitch softball, the sports training apparatus can be positioned in front of the pitcher to give an accurate guide at release. This will give the pitcher an instant feedback for the correctness of the release. It will insure that the ball falling on the target plate is the height desired for the pitch. Many softball leagues have a minimum and maximum height limit to the pitch. This device can help train the pitcher in both of these limiting factors.

In an alternative embodiment of the current disclosure, the sports training apparatus includes a base portion that supports a first telescoping pole. A second telescoping pole mates within and is secured to the first telescoping pole. A third telescoping pole mates with and is secured to the second telescoping pole. The top of the third telescoping pole has a tubing angle mount secured thereto, which mates with a horizontal rod. Unlike other embodiments, there is no angled pole attachment and no angled pole.

Figure 8:
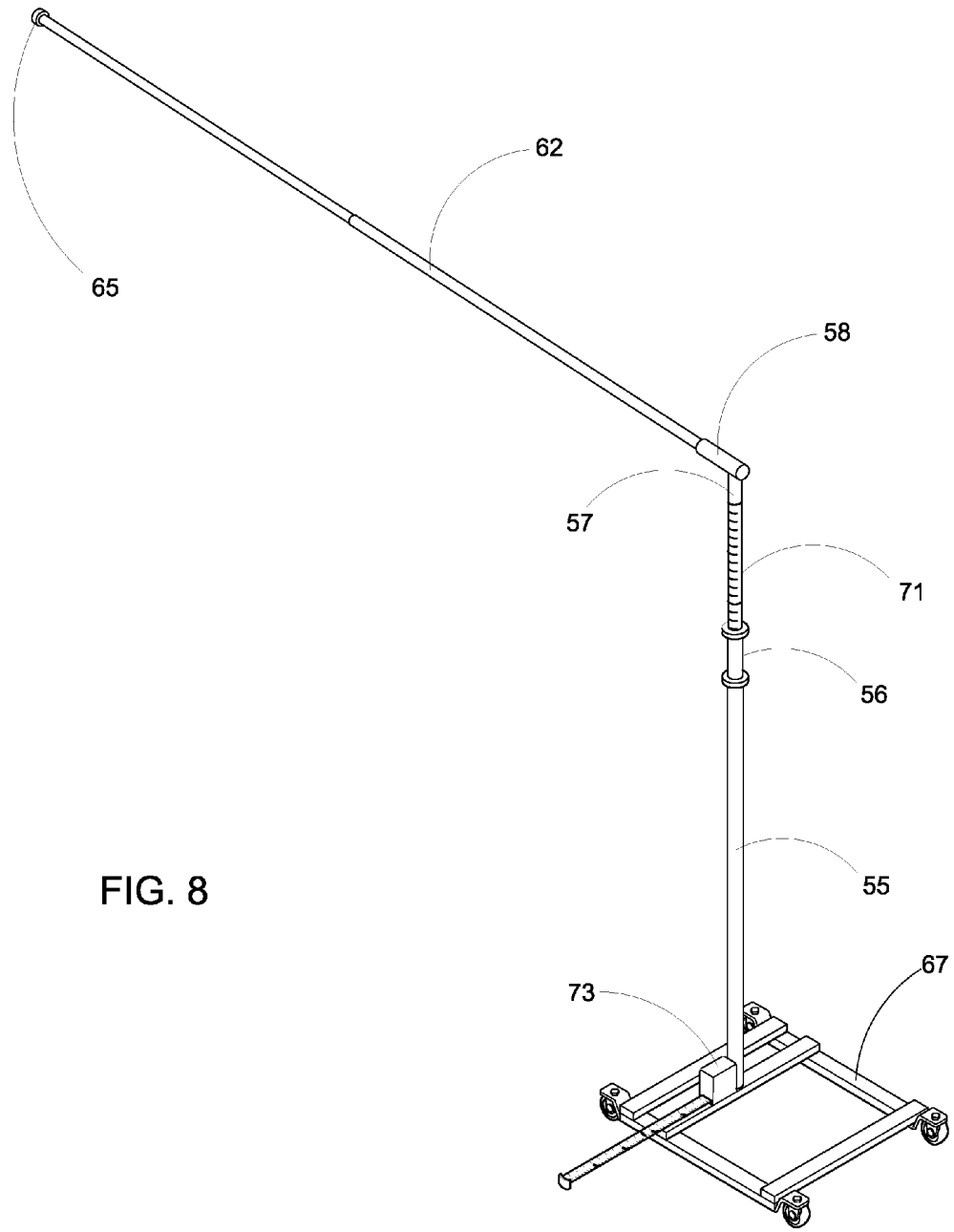
FIG. 8 is a perspective view of a sports training apparatus according to selected embodiments of the current disclosure.

FIG. 8 is a perspective view of a sports training apparatus according to selected embodiments of the current disclosure. The sports training apparatus includes a first telescoping member (55), a second telescoping member (56), and a third telescoping member (57). A horizontal member (62) is secured to the third telescoping member (57) via angle mount (58). The first telescoping member (55) is secured to a base (67) that includes lockable wheels. A tape measure (73), discussed in more detail below, is secured to the first telescoping member (55). A bell (65) or other noise making device may be secured to the opposing end of the horizontal member (62) to provide an audible signal if the horizontal member (62) is struck.

The second telescoping pole is marked along its length in one-inch increments for measuring purposes. The marks allow the user to view and set the height of the horizontal member. Thus, if a particular height of the sports training apparatus is desired, the user can fully extend the third telescoping pole, and then extend the second telescoping pole until the appropriate one-inch mark lines up with the top of the first telescoping pole indicating the desired height has been reached.

A further embodiment provides for the third telescoping pole (57) to include marks (71) along its length in one-inch increments for measuring purposes. Thus, if a particular height of the sports training apparatus is desired, the user can fully extend the second telescoping pole, and then extend the third telescoping pole until the appropriate one-inch mark lines up with the top of the second telescoping pole indicating the desired height has been reached.

While markings on the telescoping poles have been described above at one-inch increments, other increments are contemplated without departing from the scope of the current disclosure, including one-centimeter increments and one-half-inch increments.

A tape measure may also be affixed to one of the telescoping poles to measure the distance of the shot, that is, the distance from the target to the sports training apparatus. The sports training apparatus is positioned at the shooting spot, and the tape measure is pulled out from the shooting spot to the basket so the shot distance can be measured. After measuring the distance, the sports training apparatus is repositioned and its height adjust according to the discussion below. A particular embodiment provides for a tape measure that is thirty feet in length, to provide a sufficient measuring distance for many if not all uses of the sports training apparatus.

The positioning of the sports training apparatus depends upon the sport being played, the position of the player, and the desired angle of the shot. For the sport of basketball, the positioning of the sports training apparatus is determined by a formula that entails the height of ball release, distance from the basket, and the distance of trainer from the shooter. The equation and corresponding chart discussed below utilize these factors to correctly determine the proper horizontal member height for each shot. The ball traveling just over the horizontal member will then travel on the desired 45-degree entry arc into the basket.

An embodiment of the current disclosure provides for a method for determining the appropriate position and height of the sports training apparatus for the sport of basketball. First, the shooter should go through her normal shooting motion and raise the horizontal cross bar to the release point of her shot. The height of release for her shot is determined using the marks located on the sports training apparatus. If not shooting from the free throw line, three-point line, or other standard distance from the basketball hoop, the distance from the shot point to the basketball hoop is determined using the measuring tape. The shooter may go through the shooting motion to determine how far in front of their body they release the ball. The vertical pole of the trainer should be four feet from this point, and the distance to the basketball hoop is measured. The measuring tape is stretched from the sports training apparatus to the position of the basketball hoop.

With the release height of the shooter and the distance from the hoop, the appropriate height for the sports training apparatus may be determined. The height of the horizontal member is determined by the following formula:

$$X = 4 + H + \frac{(16H - 160)}{D^2} + \frac{(64 - 8H)}{D} - G \qquad \text{Equation1}$$

where H is the release height of the shooter, D is the distance of the shooter from the hoop, G is one-half the diameter of the ball, and X is the height of the horizontal member. If the shooter is using a men's basketball, G will be equal to about five inches. If the shooter is using a women's basketball, G will be equal to about four and one-half inches. Once the height of horizontal member of the sport training apparatus (and thus the height overall of the sports training apparatus) is determined and set, the vertical telescoping poles are positioned four feet away from the positions of the shooter, towards the basket. Shooting consistently over the horizontal stick will repeatedly put the ball on the same desired entry arc.

The following table shows various heights of the sports training apparatus, rounded to the nearest inch, based upon different distances from the basketball hoop.

TABLE 1

| Release Height | Distance From Hoop | Height of Sports Training Apparatus |
|---|---|---|
| 9.5 feet | 25 feet | 13.0 feet |
| 9.5 feet | 20 feet | 12.9 feet |
| 8 feet | 20 feet | 11.9 feet |
| 8 feet | 15 feet | 11.9 feet |
| 8 feet | 10 feet | 11.7 feet |

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

That which is claimed:

1. A method of using a sports training apparatus, where the sports training apparatus comprises a base portion, where the base portion comprises a plurality of wheels; a telescoping member, where the telescoping member is secured to the base portion, where the telescoping member comprises a plurality of coaxially engaging poles, where at least one of the plurality of coaxially engaging poles comprises marks along its length at fixed increments of distance, where the telescoping member further comprises a plurality of pole fasteners; a horizontal member; and an angle mount, where the angle mount secures the horizontal member to the telescoping member, where the horizontal member is substantially perpendicular to the telescoping member; comprising the steps of:

extending the telescoping member such that the height of the horizontal member corresponds to a height of release of a user hitting or throwing an object;

determining the height of the horizontal member by reading the marks along the length of at least one of the coaxially engaging poles;

determining the distance between the shooter and a target;

calculating the appropriate height of the horizontal member, wherein the appropriate height of the horizontal member is calculated using the following equation:

$$X = 4 + H + \frac{(16H - 160)}{D^2} + \frac{(64 - 8H)}{D}$$

where H is the release height of the shooter, D is the distance of the shooter from the hoop, and X is the height of the horizontal member;

extending the telescoping member to the calculated appropriate height of the horizontal member; and engaging one or more of the plurality of pole fasteners.

2. The method of claim 1, wherein marks along the length of at least one of the coaxially engaging poles is at fixed increments of one-inch.

3. The method of claim 1, wherein the sports training apparatus further comprises a tape measure, where the tape measure is secured to the telescoping member.

4. The method of claim 3, wherein the step of determining the distance between the shooter and a target uses the tape measure.

5. The method of claim 1, further comprising the step of positioning the sports training apparatus four feet away from the shooter.

6. The method of claim 1, wherein the horizontal member of the sports training apparatus comprises a plurality of horizontal sections and an elastic cord, where the elastic cord secures the horizontal sections together.

7. The method of claim 6, wherein each of the plurality of horizontal sections of the horizontal member is tapered.

8. The method of claim 1, wherein the sports training apparatus further comprises a bell, where the bell is secured to an end of the horizontal member of the sports training apparatus.

9. The method of claim 1, wherein the horizontal member of the sports training apparatus further comprises a plurality of flags.

\* \* \* \* \*